United States Patent
Armstrong et al.

(10) Patent No.: US 12,056,682 B2
(45) Date of Patent: Aug. 6, 2024

(54) TRANSACTION CHANGE BACK PROCESSING

(71) Applicant: NCR Voyix Corporation, Atlanta, GA (US)

(72) Inventors: Joshua Michael Armstrong, Vista, CA (US); Rajan Babu Vesangi, Hyderabad (IN)

(73) Assignee: NCR Voyix Corporation, Atlanta, GA (US)

( * ) Notice: Subject to any disclaimer, the term of this patent is extended or adjusted under 35 U.S.C. 154(b) by 297 days.

(21) Appl. No.: 17/243,791

(22) Filed: Apr. 29, 2021

(65) Prior Publication Data

US 2022/0351179 A1 Nov. 3, 2022

(51) Int. Cl.
*G06Q 20/32* (2012.01)
*G06F 16/2457* (2019.01)
(Continued)

(52) U.S. Cl.
CPC ..... *G06Q 20/3276* (2013.01); *G06F 16/2457* (2019.01); *G06K 7/1417* (2013.01); *G06K 19/06037* (2013.01); *G06K 19/06112* (2013.01); *G06Q 20/02* (2013.01); *G06Q 20/1085* (2013.01); *G06Q 20/202* (2013.01); *G06Q 20/209* (2013.01); *G06Q 20/3223* (2013.01); *G06Q 20/326* (2020.05);
(Continued)

(58) Field of Classification Search
CPC ............... G06Q 20/3276; G06Q 20/02; G06Q 20/1085; G06Q 20/202; G06Q 20/209; G06Q 20/3223; G06Q 20/326; G06Q 20/3676; G06Q 30/0279; G06F 16/2457; G06K 7/1417; G06K 19/06037; G06K 19/06112; H04W 4/20
See application file for complete search history.

(56) References Cited

U.S. PATENT DOCUMENTS 6,088,682 A * 7/2000 Burke ................... G06Q 20/209
705/17
7,395,958 B2 * 7/2008 Haber .................... G06Q 20/06
235/383

(Continued)

OTHER PUBLICATIONS

Polk, MaryScott. "What to Do With Leftovers: Collecting Earmarked Donations Through Mobile Payment Apps." Available at SSRN 3772517 (2021). (Year: 2021).*

*Primary Examiner* — Asfand M Sheikh
(74) *Attorney, Agent, or Firm* — Schwegman Lundberg & Woessner, P.A.

(57) ABSTRACT

When change back is due to a customer at a transaction terminal after a cash payment made by the customer during checkout, a code is generated and rendered on a display of the terminal. The customer captures the code with a camera of a customer-operated device causing a mobile application to launch on the device requesting that the customer designate how the customer wants the change back to be provided. The customer can select a loyalty wallet, a digital wallet, and/or a donation wallet for transferring some or all of the change back. The designated amount of the change back is transferred to the customer-selected wallet(s) and any remaining cash bills still due to the customer as remaining change back is provided to the customer and the transaction concludes at the terminal.

11 Claims, 4 Drawing Sheets

(51) Int. Cl.
*G06K 7/14* (2006.01)
*G06K 19/06* (2006.01)
*G06Q 20/02* (2012.01)
*G06Q 20/10* (2012.01)
*G06Q 20/20* (2012.01)
*G06Q 20/36* (2012.01)
*G06Q 30/0279* (2023.01)
*G06Q 30/0226* (2023.01)
*H04W 4/20* (2018.01)

(52) U.S. Cl.
CPC ..... *G06Q 20/3676* (2013.01); *G06Q 30/0279* (2013.01); *G06Q 30/0226* (2013.01); *H04W 4/20* (2013.01)

(56) References Cited

U.S. PATENT DOCUMENTS

| | | | |
|---|---|---|---|
| 11,288,643 B2* | 3/2022 | Dallenbach | G06Q 20/20 |
| 11,392,910 B2* | 7/2022 | Kwon | G06Q 20/065 |
| 11,423,372 B1* | 8/2022 | Martinson | G06Q 20/204 |
| 2005/0080737 A1* | 4/2005 | Stein | G06Q 40/00 |
| | | | 705/42 |
| 2007/0029378 A1* | 2/2007 | Begola | G07F 7/0866 |
| | | | 705/17 |
| 2012/0185321 A1* | 7/2012 | Lal | G06Q 30/0227 |
| | | | 705/14.28 |
| 2014/0289111 A1* | 9/2014 | Doran | G06Q 20/354 |
| | | | 705/41 |
| 2014/0370851 A1* | 12/2014 | Wang | G06Q 20/363 |
| | | | 455/411 |
| 2016/0328692 A1* | 11/2016 | Camps | G06Q 20/3223 |
| 2018/0060840 A1* | 3/2018 | Pareek | G06Q 20/40 |
| 2018/0253929 A1* | 9/2018 | Yee | G07F 17/3218 |
| 2019/0108507 A1* | 4/2019 | Cohen | G06Q 20/065 |

* cited by examiner

TRANSACTION CHANGE BACK PROCESSING

BACKGROUND

COVID19 caused a coin shortage with merchants. Merchants lacked the typical volume of customers and many customers that might typically pay with cash paid with credit card. Merchants were forced to only allow customers to pay with cash when the customer had the exact change for the transaction.

Additionally, merchants instituted a variety of policies to minimize interaction between customers and staff. One area of concern was change back during a transaction being paid for with cash. As a result, merchants were encouraging non-cash payments, which resulted in lower volume of cash paying customers and exasperated the coin shortage.

Even prior to COVID19, merchants and financial institutions have proposed programs that allow customers to use coin change for purposes of providing a donation or saving for some consumer goal, such as college education, retirement, vacation, etc. Some customers do not like to receive coin change and these programs provide a market to entice these type of customers to donate to charity or save for a customer goal.

Further, some customers prefer cash and the privacy afforded by paying with cash, since there is no electronic footprint associated with cash paying customers when the customers also fail to provide loyalty accounts for the transactions.

Moreover, a substantial subset of the population is unbanked or under-banked and cash remains the primary and preferred payment method for these types of customers. Such customers may lack a credit or debit card so that the only means of payment is cash.

As a result, creating a cashless economy remains an elusive goal and merchants must develop technologies to deal with coin change provided when a customer desires or needs to pay with cash. The technologies must also be flexible since customers may have many different preferences for their coin change back during transaction.

SUMMARY

In various embodiments, methods and a system for transaction change back processing are presented.

According to an embodiment, a method for transaction change back processing is presented. Change back details are received from a transaction terminal during a transaction with a customer when the customer provides cash as payment for the transaction during checkout and the customer is due change back. A code is generated that identifies a merchant associated with the transaction terminal and that identifies the change back details. The code is sent to the transaction terminal. A request is received to process the change back details from a mobile device of the customer that scanned the code from a display of the transaction terminal. A portion or all of the change back is transferred to one or more customer-designated wallets identified from the request. A message is sent back to the transaction terminal indicating that the change back details have been processed for the checkout.

DETAILED DESCRIPTION

Figure 1A:
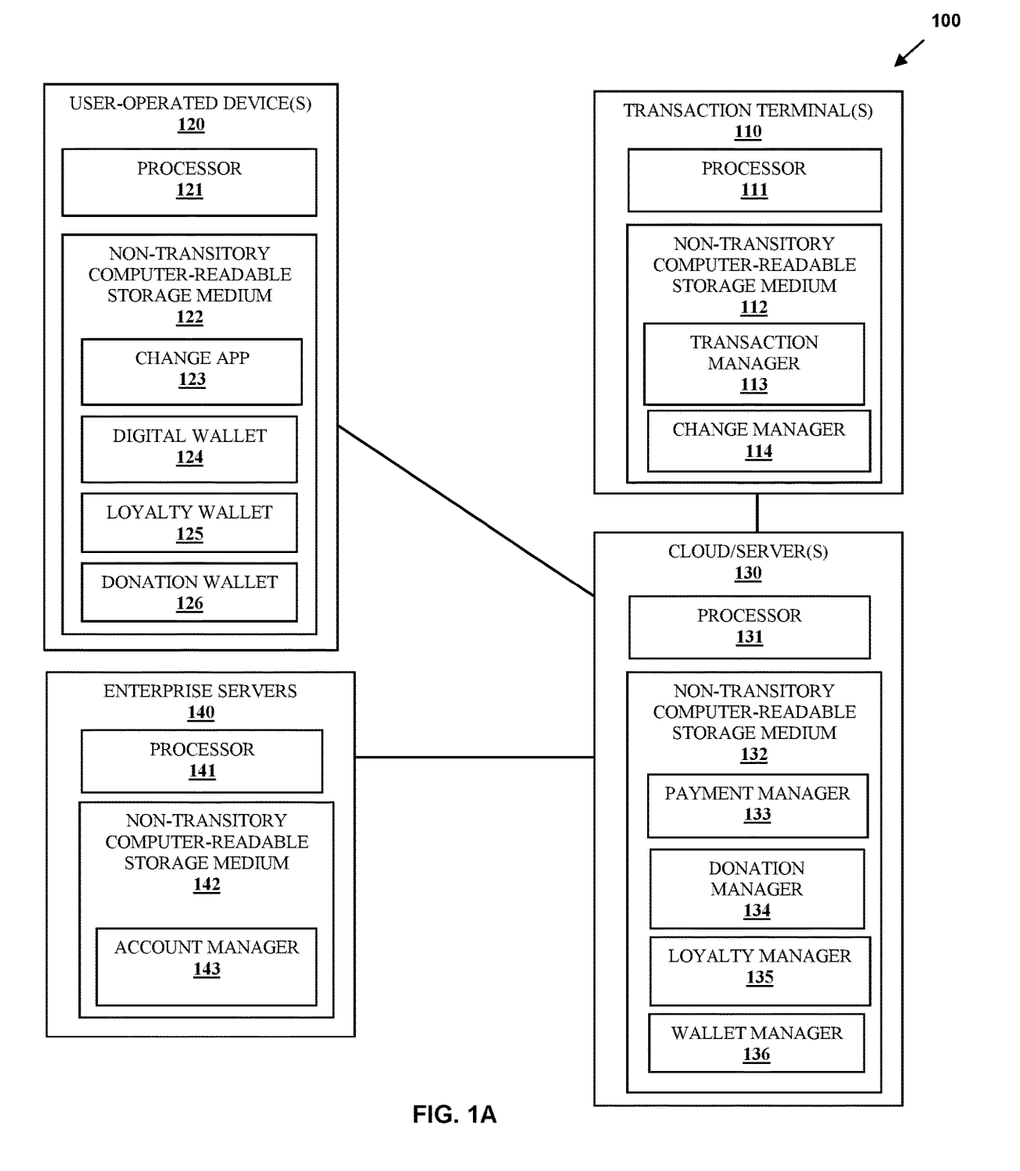
FIG. 1A is a diagram of a system for transaction change back processing, according to an example embodiment.

FIG. 1A is a diagram of a system 100 for transaction change back processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of the transaction change back processing, presented herein and below.

As will be demonstrated herein, system 100 provides techniques for transaction change back processing. When a customer pays for a transaction in cash and/or coin change is due back, the customer is prompted to scan a code displayed on the transaction terminal. This initiates an application on the customer's device and allows the customer to indicate how the customer would like to receive the cash and/or coin change associated with the customer's cash payment for the transaction. The customer may receive the change as a loyalty credit with the merchant in a loyalty wallet, may direct the change to be donated to a charity using a donation wallet, or may receive the change within a digital wallet of the customer. If desired by the customer, any cash (currency notes) due back as a portion of the transaction change may be provided to the customer from the merchant (when a cashier is performing the transaction at a transaction terminal that is a Point-Of-Sale (POS) terminal) or may be provided to the customer directly from the transaction terminal itself (such as when the transaction terminal is a Self-Service Terminal (SST) and automatically dispenses the currency bill(s) to the customer).

System 100 allows consumers to pay with cash as their preferred method of payment during a transaction while minimizing physical interaction with an attendant (during an assisted transaction) or with componentry/surfaces of a transaction terminal (during a self-service transaction). The consumers/customers are given options on their devices on how the change is to be processed (the consumers interact with their own devices to select the options); thereby reducing the possibility of virus transmission. System 100 also permits the merchants to build customer loyalty with loyalty points, when the customer selects the change to be received in a loyalty wallet; allows the customer to donate to charity when the customer selects the change to be directed to a donation wallet; or allows the customer to retain the change in a digital wallet for subsequent use by the customer with the merchant or any other merchant. The customer is in control as to how the change back is processed and only needs to interact with the customer's own device.

As used herein the terms "consumer" and "customer" may be used interchangeably and synonymously. The phrase/term "change back" or just "change" is intended to mean the amount of cash due back to a consumer after paying for a transaction in cash. "Coin change" refers to the portion of the change back that is less than $1 and "bill change" or "note change" refers to the portion of the change back that is associated with bills or notes.

System 100 comprises a transaction terminal 110, a user-operated device 120, a cloud/server 130, and a plurality of enterprise servers 140.

Transaction terminal 110 comprises a processor 111 and a non-transitory computer-readable storage medium 112. Medium 112 comprises executable instructions for a transaction manager 113 and a change manager 114. When the executable instructions are provided to and executed by processor 111, this causes processor 111 to perform operations discussed herein and below with respect to 113-114.

User-operated device 120 (herein after just "device 120") comprises a processor 121 and a non-transitory computer-readable storage medium 122. Medium 122 comprises executable instructions for a change application (app) 123, a digital wallet 124, a loyalty wallet 125, and a donation wallet 126. When the executable instructions are provided to and executed by processor 121, this causes processor 121 to perform operations discussed herein and below with respect 123-126.

Cloud/server 130 comprises a processor 131 and a non-transitory computer-readable storage medium 132. Medium 132 comprises executable instructions for a payment manager 133, a donation manager 134, a loyalty manager 135, and a wallet manager 136. When the executable instructions are provided to and executed by processor 131, this causes processor 131 to perform operations discussed herein and below with respect to 133-136.

Each enterprise server 140 comprises a processor 141 and a non-transitory computer-readable storage medium 142. Medium 142 comprises executable instructions for an account manager 143. When the executable instructions are provided to and executed by processor 141, this causes processor 141 to perform operations discussed herein and below with respect to 143.

During operation of system 100, a customer of a merchant provides cash as payment for a transaction during checkout at terminal 110. The cash exceeds the amount due as payment for the transaction resulting in change back due to the customer. Transaction manager 113 determines the change due and activates change manager 114. Change manager 114 contacts payment manager 133 of cloud 130 along with relevant transaction details. Payment manager 133 generates a unique code, such as a Quick Response (QR) code and sends back to change manager 114. Change manager 114 renders the code on a transaction screen of a display associated with terminal 110. The code may be displayed with a message to the customer indicating the customer can use a camera of device 120 to scan the code for purposes of allowing the customer to determine how the change due to the customer is to be processed to conclude the checkout for the transaction.

The customer opens a camera app on device 120 and captures an image of the displayed code. This causes change app 123 to be initiated on device 120. Change app 123 presents options to the customer through a user-facing interface with respect to how the change is to be processed and establishes a connection to payment manager 133. The customer selects one or more of the options directing that coin change, the bill change, or all the change back that is due to the customer be directed to digital wallet 124, loyalty wallet 125, and/or donation wallet 126.

Payment manager receives the option(s) selected from change app 123 and directs donation manager 134, loyalty manager 135, and/or wallet manager 136 to transfer the change back (coins and/or bills plus coins) to the consumer's digital wallet 124, loyalty wallet 125, and/or donation wallet 126.

The user-facing interface of change app 123 may allow the customer to enter a digital wallet identifier for any desired transfer of the change back to a digital wallet 126 of the customer. Wallet manager 136 transfers the change back to the digital wallet 126 using the identifier. Alternatively, the customer may have registered his digital wallet identifiers with payment manager 133, such that when change app 123 establishes a connection with payment manager 133 a device identifier for device 120 is sent by change app 123 to payment manager 133. Payment manager 133 identifies a customer account from the device identifier and obtains a customer profile, which includes pre-registered wallet identifiers for the customer.

When change manager 114 requests a code for the change back of payment manager 133, payment manager 133 identifies a merchant associated with the transaction through a terminal identifier provided by change manager 114 with the request for the code. The merchant identifier is used by payment manager 133 to encode the code or link the code to the merchant's loyalty system. When the customer selects an option to receive the change back as loyalty credits into their loyalty wallet 125 (merchant-based application), payment manager provides the loyalty system and customer loyalty identifier to loyalty manager 135. Loyalty manager 135 then transfers or initiates the transfer of change back to the customer's loyalty wallet 125 through the corresponding loyalty system.

When the customer selects a donation as a source of the change back, the user-facing interface of change app 123 may request that the customer select a charity from a list of available charities. Payment manager 133 then directs donation manager 134 to direct the change back to account manager 143 associated with the designated charity and updates a donation wallet 126 to reflect the donation of the customer to the charity. Donation manager 134 may maintain a charity ledger or account based on the customer and the customer's digital wallet 126. This allows the customer to see through a user-facing interface of donation wallet 126 a variety of metrics, such as a running total amount of donations made by the customer to specific charities, a year-to-date total customer base donations made to specific charities by donation manager 134, a year-to-date community-based donations made to specific charities, line item detail of donations (donation history) for the customer, etc.

Once the change back is processed, payment manager 133 send the detail of the change back that is now due or not due (based on the customer's selected options and detail) back to change manager 114. Change manager provides the appropriate detail to transaction manager 113 and any cash or bills still due to the customer are provided and the appropriate receipt is generated to conclude the checkout of the customer at terminal 110.

A variety of features and options are also provided to system 100.

For example, change app 123 may include a user-facing interface that the customer can initiate without scanning a displayed code on a display of terminal 110 during a transaction. Change app 123 contacts payment manager 133 and obtains balances held by customer in digital wallet 124, loyalty wallet 125, and donation wallet 126. The customer can then transfer funds between wallets 124-126, perform queries, or dynamically generate reports through the user-facing interface. Payment manager 133 interacts with donation manager 134, loyalty manager 135, and wallet manager 136 to transfer funds between wallets 124-126, to perform searches, and/or generate reports. The confirmations of fund transfers, search results, and dynamically generated reports are then sent back to change app 123 for viewing by the customer.

In an embodiment, the merchant provides through loyalty wallet 125 items or rewards that can be obtained based on the customer's loyalty point balance. In some cases, the items can be purchased by redeeming points and rewards obtained based on total accumulated point levels within a given time period.

In an embodiment, the customer has a plurality of loyalty wallets 125 and digital wallets 124.

In an embodiment, investing wallets are also provided as an option to handle customer change back. For example, a cryptocurrency investment wallet, a stock purchase wallet, etc. Change app 123 provides an added option for directing all or a portion of change back to a customer-selected investment wallet.

In an embodiment, the digital wallets 124 can include wallets associated with Zell®, Venmo®, PayPal®, Apple-Pay®, Square®, etc.

In an embodiment, the donation wallet 126 can be used for transferring change back to any charity, GoFundMe®, Kickstarter®, etc.

In an embodiment, the loyalty wallets 125 can include a specific retailer's app and/or any third-party loyalty aggregation app (where points are usable across a plurality of different retailers).

In an embodiment, coin change for change back is designated by the customer to a specific wallet or charity while cash change for change back is designated by the customer to a different wallet or charity.

In an embodiment, cash change is provided back to the customer while just coin change is processed to a user designated wallet.

In an embodiment, the customer identifies a portion of cash change that is to be provided to the customer to conclude a checkout while the customer identifies a remaining portion of the cash change that is to go to one or more wallets.

In an embodiment, a profile for a registered customer provides a designated charity selection for donating via the donation wallet 126 for change back during a transaction. In this way, the customer only confirms that the change back is to go to the profile identified charity and does not have to make a selection or provide a selection for the customer's preferred charity.

In an embodiment, a profile for a registered customer provides percentages of change back through change app 123, each percentage of the change back designated by the customer to multiple different wallets and/or designated to different charities within the donation wallet 126. For example, 50% of the change back is designated by the customer to go to digital wallet 124 and 50% designated to go to loyalty wallet 125; or 100% of the change back is to go to the donation wallet 126 with 50% of the change back going to a first charity and the remaining 50% of the change back going to a second and different charity.

In an embodiment, donation manager 134 permits the customer to retain a positive balance of funds without a customer designated charity being identified. In this way, the customer can use change app 123 to either donate some of all of the positive balance to a customer designated charity when the customer is ready to make a donation or the customer may decide to move some or all of the positive balance back out of the donation wallet to either a specific digital wallet 124 and/or a specific loyalty wallet 125.

In an embodiment, merchants short on cash bills can inform a customer paying with a large bill of the ability to receive change back to a customer-designated wallet. In this way, when a merchant is unable to change a $100 or a $50 bill, the customer may still proceed with the transaction and receive the change back in a customer-designated wallet via system 100 using change app 123.

In an embodiment, when the customer scans the code from the display of terminal 110, if device 120 lacks change app 123, the code causes device 120 to download, install, and initiate change app 123 on device 120.

In an embodiment, transaction terminal 110 is a POS terminal, a SST, an Automated Teller Machine (ATM), or a kiosk.

In an embodiment, device 120 is a phone, a tablet, a laptop, or a wearable processing device.

Figure 1B:
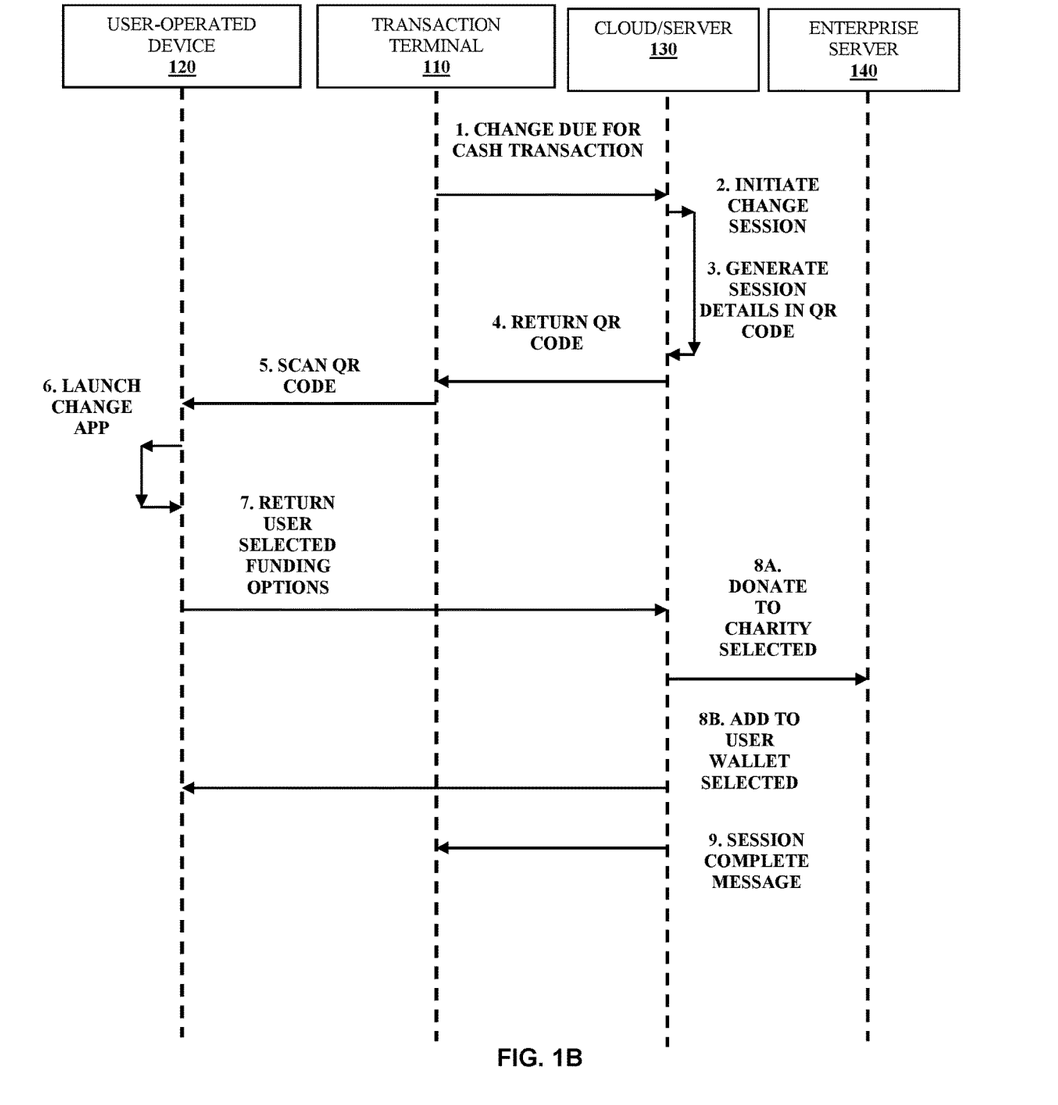
FIG. 1B is a diagram of data interaction between devices for the system of FIG. 1A, according to an example embodiment.

FIG. 1B is a diagram of data interaction between devices for the system of FIG. 1A, according to an example embodiment.

Initially, a customer provides cash as payment for a transaction at checkout. Transaction manager 113 of terminal 110 determines that change back is due based on the cash provided by the customer. The total change back due is provided to change manager 114 of terminal 110 by transaction manager 113. At 1, change manager 114 contacts payment manager 133 of cloud/server 130 providing a terminal identifier for terminal 110 and change back details for the payment that is due to the customer. At 2, payment manager 133 initiates a change back session for the transaction and generates session details in a QR code at 3. At 4, the QR code is provided back to change manager 114 of terminal 110. Change manager 114 displays the QR code on the display of terminal 110 along with instructions to the customer. The customer operates a camera of device 120 to scan or take an image of the QR code at 5. The QR code being imaged causes device 120 to launch change app 123 on device 120 at 6.

The total change back that is due is displayed to the customer along with options on where to designate the change back for the transaction. The customer selects the desired funding options at 7 and change app 123 sends a device identifier for device 120 (and/or customer identifier) along with the funding options for the change back to payment manager 133 of cloud/server 130.

At 8A, any charity that is to receive funds is processed through donation manager 134 interacting with the appropriate account manager 143 of the appropriate charity's enterprise server 140. At 8B, any digital wallet 124 or loyalty wallet 125 that is to receive funds is sent the funds through wallet manager 136 or loyalty manager 135.

At 9, payment manager sends a session complete message back to change manager 114 of terminal 110. Change manager 114 then indicates to transaction manager 113 if any of the change back is still owed to the customer, such as when the change back was only associated with funding a specific wallet with the coin change of the total change back that was due or such as when the customer transferred some of the change back but not all of the change back that was due to one or more of the wallets. If any remaining cash is due back to the customer terminal 110 dispenses the cash to the customer or a cashier operating terminal 110 provides the cash to the customer.

The above-noted embodiments and other embodiments are now discussed with reference to FIGS. 2-3.

Figure 2:
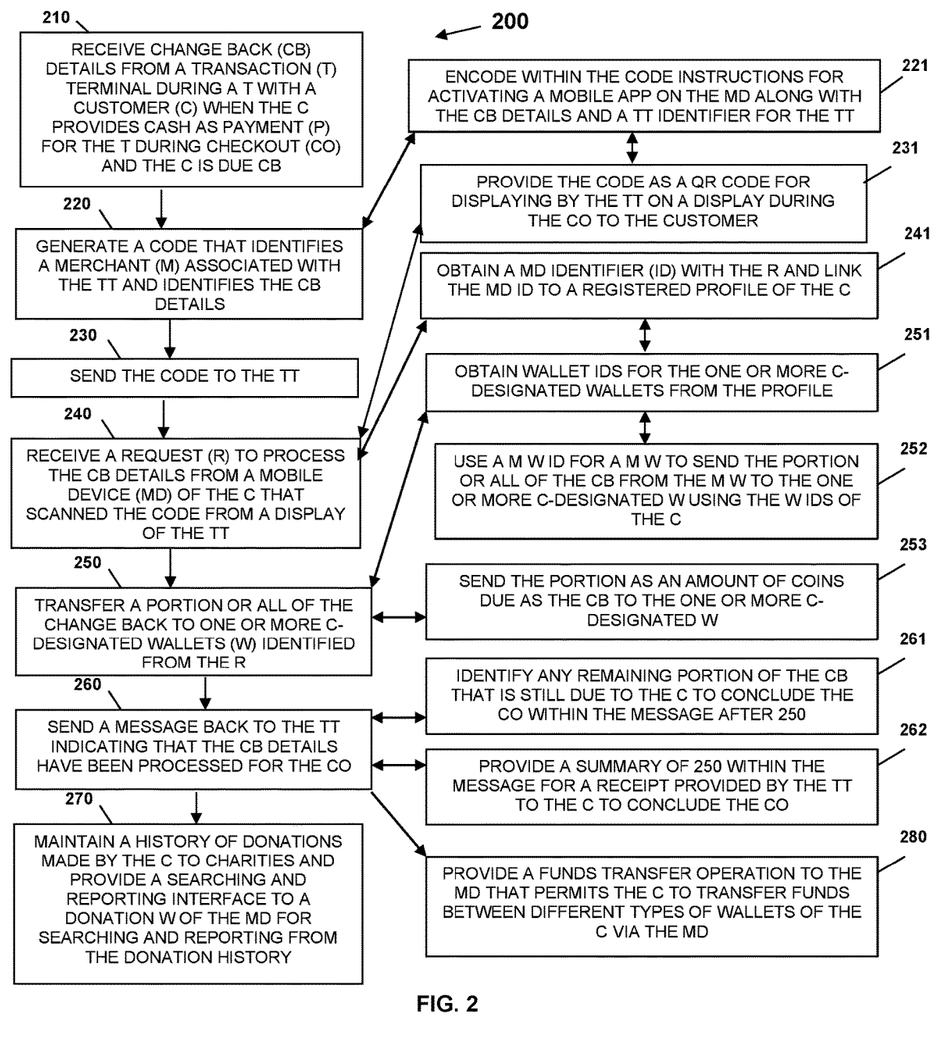
FIG. 2 is a diagram of a method for transaction change back processing, according to an example embodiment.

FIG. 2 is a diagram of a method 200 for transaction change back processing, according to an example embodiment. The software module(s) that implements the method 200 is referred to as a "change back transaction manager." The change back transaction manager is implemented as executable instructions programmed and residing within memory and/or a non-transitory computer-readable (processor-readable) storage medium and executed by one or more processors of a device or set of devices. The processor(s) of the device(s) that executes the change back transaction manager are specifically configured and programmed to process the change back transaction manager. The change back transaction manager may have access to one or more network connections during its processing. The network connections can be wired, wireless, or a combination of wired and wireless.

In an embodiment, the change back transaction manager executes on cloud 110.

In an embodiment, the change back transaction manager executes on server 110.

In an embodiment, the change back transaction manager is all or some combination of payment manager 133, donation manager 134, loyalty manager 135, and/or wallet manager 136.

At 210, change back transaction manager receives change back details from a transaction terminal during a transaction with a customer when the customer provides cash as payment for the transaction during a checkout and the customer is due change back.

At 220, the change back transaction manager generates a code that identifies a merchant associated with the transaction terminal and that identifies the change back details.

In an embodiment, at 221, the change back transaction manager encodes within the code instructions for activating a mobile application (e.g., change app 123) on a user-operated mobile device (e.g., customer-operated device 120) along with the change back details and a transaction terminal identifier for the transaction terminal 110.

At 230, the change back transaction manager sends the code to the transaction terminal 110.

In an embodiment of 221 and 230, at 231, the change back transaction manager provides the code or generates the code as a QR code for displaying by the transaction terminal 110 on a display during the checkout to the customer.

At 240, the change back transaction manager receives a request to process the change back details from the mobile device 120 of the customer that scanned or imaged the code from or off of the display of the transaction terminal 110.

In an embodiment, at 241, the change back transaction manager obtains the mobile device identifier with the request and a links the mobile device identifier to a registered profile of the customer.

At 250, the change back transaction manager transfers a portion or all of the change back to one or more customer-designated wallets identified from the request (customer-provided selections (amounts of the change back and wallets).

In an embodiment of 241 and 250, at 251, the change back transaction manager obtains wallet identifiers for the one or more customer-designated wallets from the registered profile.

In an embodiment of 251 and at 252, the change back transaction manager uses a merchant wallet identifier for a merchant wallet to send the portion or all of the change back from the merchant wallet to the one or more customer-designated wallets using the wallet identifiers of the customer.

In an embodiment, at 253, the change back transaction manager sends the portion as an amount of coins due as the change back to one or more of the customer-designated wallets.

At 260, the change back transaction manager sends a message back to the transaction terminal 110 indicating that the change back details have been processed for the checkout.

In an embodiment, at 261, the change back transaction manager identifies any remaining portion of the change back that is still due to the customer to conclude the checkout within the message after 250.

In an embodiment, at 262, the change back transaction manager provides a summary of 250 within the message for a receipt provided by the transaction terminal 110 to the customer to conclude the checkout.

In an embodiment, at 270, the change back transaction manager maintains a history of donations made by the customer to charities and provide a search and report interface to a donation wallet of the mobile device 120 for custom searching and reporting from the donation history.

In an embodiment, at 280, the change back transaction manager provides a funds transfer operation to the mobile device 120 that permits the customer to transfer funds between different types of wallets of the customer via the mobile device. The different types of wallets can include digital wallets, loyalty wallets, donation wallets, cryptocurrency wallets, and/or investing wallets.

Figure 3:
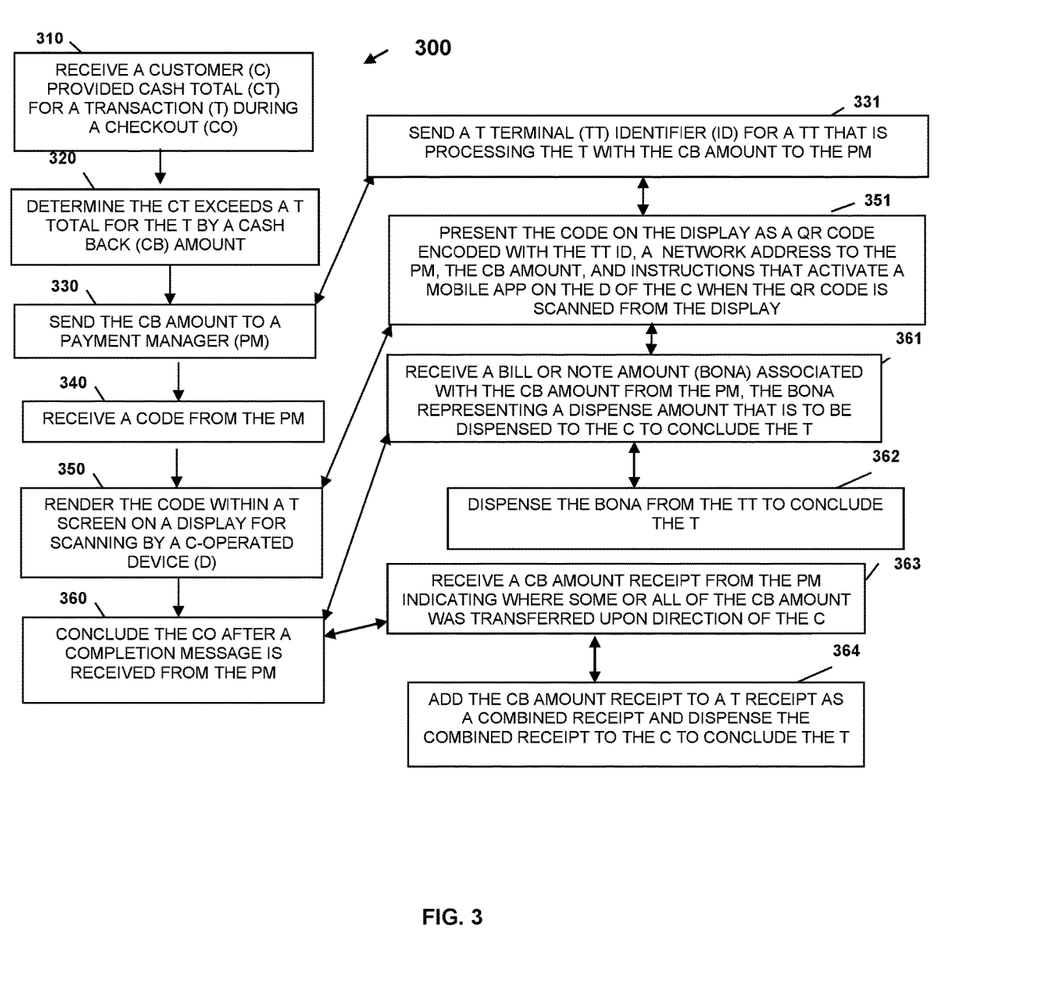
FIG. 3 is a diagram of another method for transaction change back processing, according to an example embodiment

FIG. 3 is a diagram of another method 300 for transaction change back processing, according to an example embodiment. The software module(s) that implements the method 300 is referred to as a "change back transaction terminal agent." The change back transaction terminal agent is implemented as executable instructions programmed and residing within memory and/or a non-transitory computer-readable (processor-readable) storage medium and executed by one or more processors of a device. The processor(s) of the device that executes the change back transaction terminal agent are specifically configured and programmed to process the change back transaction terminal agent. The change back transaction terminal agent may have access to one or more network connections during its processing. The network connections can be wired, wireless, or a combination of wired and wireless.

In an embodiment, the device that executes the change back transaction terminal agent is transaction terminal 110.

In an embodiment, transaction terminal 110 is a POS terminal, a SST, an ATM, or a kiosk.

In an embodiment, the change back transaction terminal agent is all of, or some combination of, transaction manager 113 and/or change manager 114.

The change back transaction terminal agent interacts with method 200 during a transaction checkout for which a customer pays with cash and for which change back is due to the customer.

At 310, change back transaction terminal agent receives a customer provided cash total for a transaction during a checkout.

At 320, the change back transaction terminal agent determines that the cash total exceeds a transaction total by a change back amount that is due to the customer to conclude the transaction.

At 330, the change back transaction terminal agent sends the change back amount to a payment manager 133.

In an embodiment, at 331, the change back transaction terminal agent sends a transaction terminal identifier for a transaction terminal 110 that is processing the transaction with the change back amount to the payment manager 133.

At 340, the change back transaction terminal agent receives a code from the payment manager 133.

At 350, the change back transaction terminal agent renders the code within a transaction screen on a display for scanning by a customer-operated device 120.

In an embodiment of 331 and 350, at 351, the change back transaction terminal agent presents the code on the display as a QR code encoded with the transaction terminal identifier, a network address to the payment manager 133, the change back amount, and instructions that activate a mobile app 123 on the mobile device 120 when the QR code is scanned from the display.

At 360, the change back transaction terminal agent concludes the checkout after a completion message is received from the payment manager 133.

In an embodiment of 351 and 360, at 361, the change back transaction terminal agent receives a bill or note amount associated with the change back amount from the payment manager 133. The bill or note amount represents a dispense amount that is to be dispensed to the customer to conclude the transaction at the transaction terminal 110.

In an embodiment of 361 at 362, the change back transaction terminal agent causes the transaction terminal 110 to dispense the bill or note amount to conclude the transaction or the checkout.

In an embodiment, at 363, the change back transaction terminal agent receives a change back amount receipt from the payment manager 133 indicating where some or all of the change back amount was transferred upon direction by the customer (the amounts and the wallets that were funded with some portion or all of the change back amount).

In an embodiment of 363 at 364, the change back transaction terminal agent adds the change back amount receipt to a transaction receipt as a combined receipt and dispenses the combined receipt to the customer to conclude the transaction or the checkout at the transaction terminal 110.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving change back details from a transaction terminal during a transaction with a customer when the customer provides cash as payment for the transaction during checkout and the customer is due change back;
generating a code that identifies a merchant associated with the transaction terminal and that identifies the change back details;
sending the code to the transaction terminal;
generating a user interface on a mobile device of the customer which display the change back details and available allocation options when the customer scans the code using the mobile device;
receiving a user selection via the user interface indicating how a portion or all of the change back is to be allocated in one or more customer-designated wallets comprising a digital wallet, loyalty wallet, and donation wallet;
receiving the user selection as a request to process the change back details from the mobile device, wherein receiving the request to process further includes sending a mobile device identifier and the request, during the transaction, to a payment manager that manages a registered profile of the customer;
transferring a portion or all of the change back to the one or more customer-designated wallets identified from the request, wherein transferring further includes obtaining, from the payment manager, percentages obtained from the registered profile to associate with the portion, each percentage of the portion transferred to one of the one or more customer-designated wallets;
sending a message back to the transaction terminal indicating that the change back details have been processed for the checkout; and
providing a funds transfer operation to the mobile device that permits the customer to transfer funds between different types of wallets of the customer via the mobile device.

2. The method of claim 1 further comprising, maintaining a history of donations made by the customer to charities and provide a search and reporting interface to a donation wallet of the mobile device for searching and reporting from the history.

3. The method of claim 1, wherein generating further includes encoding within the code instructions for activating a mobile application on the mobile device along with the change back details and a transaction terminal identifier for the transaction terminal.

4. The method of claim 3, wherein sending the code further includes providing the code as a Quick Response (QR) code for displaying by the transaction terminal on a display during the checkout to the customer.

5. The method of claim 1, wherein transferring further includes obtaining wallet identifiers for the one or more customer-designated wallets from the profile.

6. The method of claim 5, wherein obtaining further includes using a merchant wallet identifier for a merchant wallet to send the corresponding percentage of the portion of the change back from the merchant wallet to the corresponding one or more customer-designated wallets using the wallet identifiers of the customer.

7. The method of claim 1, wherein transferring further includes sending the portion as an amount of coins due as the change back to the one or more c-designated wallets.

8. The method of claim 1, wherein sending the message further includes identifying any remaining portion of the change back that is still due to the customer to conclude the checkout within the message after the transferring.

9. The method of claim 1, wherein sending the message further includes providing a summary of the transferring within the message for a receipt provided by the transaction terminal to the customer to conclude the checkout.

10. A system, comprising:
a server comprising at least one processor and a non-transitory computer-readable storage medium;
the non-transitory computer-readable storage medium comprises server executable instructions;
a transaction terminal comprising at least one terminal processor and a terminal non-transitory computer-readable storage medium;
the terminal non-transitory computer-readable medium comprises terminal executable instructions;
the terminal executable instructions when executed by the at least one terminal processor from the terminal non-transitory computer-readable storage medium cause the at least one terminal processor to perform operations comprising:
processing a transaction on behalf of a customer at the transaction terminal;
receiving a cash amount as payment for a transaction total amount;
determining the cash amount exceeds the transaction total amount by a change back amount;
sending a transaction terminal identifier for the transaction terminal and the change back amount to the server executable instructions;
receiving a Quick Response (QR) code back from the server executable instructions;
rendering the QR code on a display of the transaction terminal for scanning by a customer-operated device to direct where the change back amount is to be directed;
receiving a message from the server executable instructions indicating that the change back amount has been transferred as directed by the customer and indicating whether any cash bills are still owed to the customer from the change back amount;
dispensing from the transaction terminal the cash bills if still owed to the customer; and
providing a transaction receipt to the customer and concluding the transaction at the transaction terminal;
the server executable instructions when executed by the at least one processor from the non-transitory computer-readable storage medium cause the at least one processor to perform second operations comprising:
receiving the transaction terminal identifier and the change back amount from the terminal executable instructions;
identifying an enterprise associated with the transaction terminal identifier;
generating the QR code encoded with the transaction terminal identifier, an enterprise identifier for the enterprise, the change back amount, and instructions to activate a mobile application on the customer-operated device when the QR code is scanned from the display of the transaction terminal by the customer using the customer-operated device;
sending the QR code to the terminal executable instructions;
generating a user interface on the customer-operated device displaying the change back amount and wallet options;
receiving a user selection of one or more wallets comprising a digital wallet, loyalty wallet, and donation wallet and allocation percentages for transferring the change back amount;
receiving the wallet options from the mobile application based on the user selection along with a mobile device identifier for the customer-operated device;
obtaining wallet identifiers corresponding to the wallet options from a registered profile of the customer identified using the mobile device identifier, wherein the registered profile is maintained and managed by the server executable instructions and wherein the server executable instructions representing a payment manager;
obtaining percentages of the change back amount from the registered profile, each percentage associated with a particular wallet identifier;
transferring a corresponding percentage of the change back amount to a corresponding wallet identifier for each wallet identifier; and
sending the message to the terminal executable instructions indicating whether any cash bills are still due to the customer to conclude the transaction after the transferring along with a wallet receipt indicating the customer-designated amounts and corresponding wallets associated with the one or more of the wallet identifiers within the message; and
providing a funds transfer operation to the customer-operated device that permits the customer to transfer funds between different types of wallets of the customer via the customer-operated device.

11. The system of claim 10, wherein the managed device is an Automated Teller Machine (ATM), a Self-Service Terminal (SST), a Point-Of-Sale (POS) terminal, or a kiosk.

* * * * *